United States Patent
Kwack et al.

(10) Patent No.: US 12,482,897 B2
(45) Date of Patent: Nov. 25, 2025

(54) SEPARATOR FOR SECONDARY BATTERY, METHOD FOR MANUFACTURING THE SAME AND LITHIUM SECONDARY BATTERY CONTAINING THE SAME

(71) Applicants: SK Innovation Co., Ltd., Seoul (KR); SK ie technology Co., Ltd., Seoul (KR)

(72) Inventors: Won Sub Kwack, Daejeon (KR); Sang Ick Lee, Daejeon (KR); Tae Wook Kwon, Daejeon (KR); Yun Bong Kim, Daejeon (KR); Heung Taek Bae, Daejeon (KR); Sang Yoon Ji, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 653 days.

(21) Appl. No.: 17/713,525

(22) Filed: Apr. 5, 2022

(65) Prior Publication Data
US 2022/0328931 A1  Oct. 13, 2022

(30) Foreign Application Priority Data
Apr. 6, 2021  (KR) .......... 10-2021-0044792

(51) Int. Cl.
*H01M 50/446* (2021.01)
*C07F 5/06* (2006.01)
*H01M 10/0525* (2010.01)
*H01M 50/491* (2021.01)

(52) U.S. Cl.
CPC ..... *H01M 50/446* (2021.01); *H01M 10/0525* (2013.01); *H01M 50/491* (2021.01); *C07F 5/066* (2013.01)

(58) Field of Classification Search
None
See application file for complete search history.

(56) References Cited

U.S. PATENT DOCUMENTS

2023/0090568 A1* 3/2023 Jeong ............... H01M 10/0525
429/246

FOREIGN PATENT DOCUMENTS

| CN | 109192904 A | 1/2019 | |
| JP | 2012138188 A | 7/2012 | |
| KR | 1020190062924 A | 6/2019 | |
| KR | 20210072531 | * 12/2019 | |
| WO | WO-2021201606 A1 * | 3/2021 | .......... H01M 10/052 |

OTHER PUBLICATIONS

Translation of KR20210072531A (Year: 2021).*
Fini et al., "Aluminum lactate role in improving hydration and drying behavior of MgO-bonded refractory castables", Ceramics International, Elsevier, 2020, pp. 17093-17102.

* cited by examiner

*Primary Examiner* — Jonathan G Leong
*Assistant Examiner* — Taeyoung Son
(74) *Attorney, Agent, or Firm* — The Webb Law Firm

(57) ABSTRACT

Provided are a separator for a secondary battery, a method for manufacturing the same, and a lithium secondary battery including the same, and particularly, a separator for a secondary battery which has sufficient thermal resistance and mechanical properties even without using a polymer-based organic binder lacking chemical stability, by adopting a metal alkanoate having a polar group as a binder for binding among particles forming a porous active layer and also between the porous active layer and a porous substrate. A method for manufacturing the same, and a lithium secondary battery including the same are also provided.

20 Claims, No Drawings

SEPARATOR FOR SECONDARY BATTERY, METHOD FOR MANUFACTURING THE SAME AND LITHIUM SECONDARY BATTERY CONTAINING THE SAME

CROSS-REFERENCE TO RELATED APPLICATION

This application claims priority to Korean Patent Application No. 10-2021-0044792, filed Apr. 6, 2021, the disclosure of which is hereby incorporated by reference in its entirety.

BACKGROUND OF THE INVENTION

Field of the Invention

The following disclosure relates to a separator for a secondary battery, a method for manufacturing the same, and a lithium secondary battery including the same.

Description of Related Art

In recent years, according to high capacity and high output trends of a secondary battery, there is a growing demand for high strength, high permeability, and thermal stability of a separator, and improved characteristics of a separator for electrical safety of a secondary battery during charge and discharge. The lithium secondary battery is required to have high mechanical strength for improving safety in a battery manufacture process and during use of the battery, and to have high permeability and high thermal stability for improving a capacity and output.

In addition, the secondary battery is charged/discharged by repeating a process of intercalating and deintercalating a lithium ion of a positive electrode into/from a negative electrode. When the charge and discharge are repeated, a theoretical capacity of a battery varies depending on the type of an electrode active material, but as the cycle proceeds, a charge and discharge capacity decreases.

Conventionally, as an aspect for improving thermal resistance of a separator for a secondary battery, a ceramic layer formed of inorganic particles or inorganic particles and organic particles is introduced on a porous sheet such as a polyolefin, thereby securing safety of a battery and commercializing the battery.

However, when the ceramic layer is introduced to a porous sheet layer such as polyolefin, a polymer binder is used for adhesion of a ceramic layer and a porous sheet or binding among inorganic particles, and when the organic binder is used as such, various problems which degrade battery performance, such as a chemical reaction between an electrolyte solution of a battery and organic binder components, elution of an organic binder dissolved in an electrolyte solution, closure of a porous layer by an organic binder swollen by an electrolyte solution, degradation of electrolyte solution performance by gassing or elution, or an increased capacity of a battery by swelling have arisen.

A process for manufacturing a novel separator having excellent thermal and electrochemical stability, and being advantageous for securing pores, for solving the problems, is demanded.

SUMMARY OF THE INVENTION

An embodiment of the present invention is directed to providing a novel separator which may dispense with an organic binder, suppresses a change over time of battery performance, and is more permanently and chemically stable.

Another embodiment of the present invention is directed to providing a separator for a secondary battery having better thermal resistance.

Another embodiment of the present invention is directed to providing a novel separator which is manufactured by completely or sufficiently removing closure of pores or elution into an electrolyte solution, in which lithium ion movement is smooth to significantly improve electrical properties such as a capacity retention of a secondary battery.

Another embodiment of the present invention is directed to providing a separator which has better battery dimensional stability with a higher capacity and a larger size and further increases battery safety with little thickness deviation even in the case of using a battery stacked in hundreds of layers for a long time.

Still another embodiment of the present invention is directed to providing an electrochemical device having excellent performance, specifically a lithium secondary battery.

In one general aspect,
a separator for a secondary battery includes: (a) a porous substrate; and
(b) a porous active layer formed by including a metal alkanoate having a polar group and particles including inorganic particles on one or both surfaces of the porous substrate,
wherein the metal alkanoate having a polar group binds among the particles and also between the particles and the porous substrate.

In an exemplary embodiment, the polar group may be any one or a combination of two or more selected from a hydroxyl group, a carbonyl group, an amine group, and a thiol group.

In an exemplary embodiment, the metal alkanoate having a polar group may have a structure represented by the following Chemical Formula 1:

  [Chemical Formula 1]

wherein M is any one selected from alkali earth metals, transition metals, Al, Ga, In, Sn, Pb, Ge, and Sb, R is a C1 to C10 substituted or unsubstituted alkyl group having the polar group, and a is an integer selected from 2 to 4.

In an exemplary embodiment, the metal alkanoate having a polar group may be aluminum L-lactate.

In an exemplary embodiment, the inorganic particles may be any one or a mixture of two or more selected from metal oxides, metal nitrides, metal carbides, metal carbonates, metal hydrates, metal sulfate and metal carbonitrides.

In an exemplary embodiment, the inorganic particles may be any one or a mixture of two or more selected from boehmite, $Al_2O_3$, $Al(OH)_3$, $TiO_2$, $CeO_2$, MgO, $Mg(OH)_2$, NiO, $Y_2O_3$, CaO, $SrTiO_3$, $BaTiO_3$, $SnO_2$, ZnO, $ZrO_2$, $BaSO_4$, silica, and glass powder.

In an exemplary embodiment, a size of the inorganic particles may be 10 nm to 3 μm.

In an exemplary embodiment, the metal alkanoate having a polar group may be included at 0.1 to 30 parts by weight based on 100 parts by weight of the total amount of the porous active layer.

In an exemplary embodiment, the particles may be included at 70 to 99.9 parts by weight based on 100 parts by weight of the total amount of the porous active layer.

In an exemplary embodiment, the porous active layer may further include an organic binder.

In an exemplary embodiment, the organic binder may be included at 0.1 to 70 parts by weight based on 100 parts by weight of contents of the metal alkanoate having a polar group and the organic binder in the porous active layer.

In an exemplary embodiment, the organic binder may be included at less than 1 part by weight based on 100 parts by weight of the total amount of the porous active layer.

In an exemplary embodiment, any one or both selected from a surface and a pore portion of the porous substrate may be coated with the metal alkanoate having a polar group.

In another general aspect, a method for manufacturing a separator for a secondary battery includes: applying a slurry including a metal alkanoate having a polar group and particles including inorganic particles on one or both surfaces of the porous substrate; and drying the porous substrate coated with the slurry to form a porous active layer.

In an exemplary embodiment, the polar group may be any one or a combination of two or more selected from a hydroxyl group, a carbonyl group, an amine group, and a thiol group.

In an exemplary embodiment, the metal alkanoate having a polar group may have a structure represented by the following Chemical Formula 1:

 [Chemical Formula 1]

wherein M is any one selected from alkali earth metals, transition metals, Al, Ga, In, Sn, Pb, Ge, and Sb, R is a C1 to C10 substituted or unsubstituted alkyl group having the polar group, and a is an integer selected from 2 to 4.

In an exemplary embodiment, the metal alkanoate having a polar group may be aluminum L-lactate.

In an exemplary embodiment, the metal alkanoate having a polar group may be included at 0.1 to 30 parts by weight based on 100 parts by weight of the total amount of the porous active layer.

In still another general aspect, an electrochemical device includes the separator for a secondary battery.

In an exemplary embodiment, the electrochemical device may be a lithium secondary battery.

Other features and aspects will be apparent from the following detailed description, the drawings, and the claims.

DESCRIPTION OF THE INVENTION

Hereinafter, a separator for a secondary battery, a method for manufacturing the same, and a lithium secondary battery including the same according to the present disclosure will be described in detail.

Herein, unless otherwise defined, all technical terms and scientific terms have the same meanings as those commonly understood by those skilled in the art to which the present disclosure pertains. The terms used herein are only for effectively describing a certain specific example, and are not intended to limit the present disclosure. Further, unless otherwise stated, the unit of added materials herein may be a part by weight.

In addition, the singular form used in the specification and claims appended thereto may be intended to also include a plural form, unless otherwise indicated in the context.

Many studies were conducted in order to solve the problems, and as a result, it was found that by adopting a metal alkanoate having a polar group as a binder for binding among particles forming a ceramic layer, that is, a porous active layer of the separator and for binding between the porous active layer and a porous substrate, a novel separator having sufficient adhesive strength or better adhesive strength even without using a polymer-based organic binder having insufficient chemical stability may be provided, thereby completing the present disclosure.

An exemplary embodiment provides a separator for a secondary battery which may have a low thermal shrinkage rate, a high permeability, and excellent adhesive strength to prevent ignition or rupture due to an abnormal phenomenon such as a rapid temperature rise and significantly improve battery stability.

In addition, an exemplary embodiment provides a separator for a secondary battery which has low resistance and a small resistance deviation even with a porous active layer provided, has a characteristic that the resistance of the separator provided with the active layer relative to the resistance of the separator before being provided with the active layer is not greatly increased as compared with the resistance of the separator adopting the polymer-based organic binder, and is electrochemically stable.

Hereinafter, the present disclosure will be described in more detail.

The separator for a secondary battery according to an exemplary embodiment may include:
(a) a porous substrate; and
(b) a porous active layer formed by including a metal alkanoate having a polar group and particles including inorganic particles on one or both surfaces of the porous substrate.

Here, the metal alkanoate having a polar group acts as a binder to bind among the particles and also between the particles and the porous substrate.

The separator for a secondary battery according to an exemplary embodiment may provide an active layer which binds among particles including inorganic particles and also between the inorganic particles and a surface of the porous substrate with high adhesive strength without using an organic polymer as a binder, as compared with a ceramic active layer formed of an organic binder mainly using a polymer and particles including ceramic particles such as inorganic particles. Accordingly, the separator for a secondary battery according to an exemplary embodiment has a significantly low thermal shrinkage rate and further improved thermal resistance, and may prevent ignition or rupture by an abnormal phenomenon such as a rapid temperature rise.

In addition, the separator for a secondary battery has no pore blockage by a conventional organic polymer binder, swelling, or the like, so that ion movement is excellent, and thus, there is no obstacle to movement of ions such as lithium ions, and electrical properties such as a charge/discharge capacity or efficiency of a battery may be improved.

In addition, the separator for a secondary battery according to an exemplary embodiment has significantly increased thermal resistance and chemical resistance, may sufficiently secure adhesive strength, and may show thermal stability, electrochemical stability, excellent lithium ion conductivity, prevention of electrolyte solution contamination, and an excellent electrolyte impregnation rate at the same time.

In addition, the separator for a secondary battery according to an exemplary embodiment has minimized thermal expansion or thermal shrinkage inside an electrochemical device as compared with a separator having an active layer using a conventional polymer-based organic binder, and is not easily ruptured by excessive conditions due to internal or external factors such as high temperature, overcharge, and external impact, thereby achieving improved safety.

In the separator for a secondary battery according to an exemplary embodiment, the polar group may be any one or a combination of two or more selected from a hydroxyl group, a carbonyl group, an amine group, and a thiol group, but is not necessarily limited thereto.

In addition, in the separator for a secondary battery according to an exemplary embodiment, the metal alkanoate having a polar group may have a structure represented by the following Chemical Formula 1:

[Chemical Formula 1]

wherein M is any one selected from alkali earth metals, transition metals, Al, Ga, In, Sn, Pb, Ge, and Sb, R is a C1 to C10 substituted or unsubstituted alkyl group having the polar group, and a is an integer selected from 2 to 4, but the present invention is not necessarily limited thereto.

More specifically, in the separator for a secondary battery according to an exemplary embodiment, the metal alkanoate having a polar group may be aluminum L-lactate, but is not necessarily limited thereto.

When the separator for a secondary battery according to an exemplary embodiment includes the metal alkanoate having a polar group as described above, it may have, surprisingly, a significantly low thermal shrinkage rate, a high permeability, excellent adhesive strength, and the like, may significantly improve performance of a battery including the separator, and also, may increase thermal resistance.

In the separator for a secondary battery according to an exemplary embodiment, the metal alkanoate having a polar group may be included at 0.1 to 30 parts by weight, specifically 0.25 to 30 parts by weight, and more specifically 0.25 to 10 parts by weight, with respect to 100 parts by weight of the total amount of the porous active layer, but is not necessarily limited thereto.

Next, the particles including inorganic particles according to an exemplary embodiment will be described.

In the separator for a secondary battery according to an exemplary embodiment, the particles include inorganic particles and may be inorganic particles, organic particles, or mixed particles thereof.

The inorganic particles or organic particles as a main component are not particularly limited as long as they are electrochemically stable. As an exemplary embodiment, the inorganic particles do not cause an oxidation or reduction reaction under conditions of operating a battery, and also, may have ion transfer ability. The inorganic particles may be any one or a mixture of two or more selected from boehmite, $Al_2O_3$, $Al(OH)_3$, $TiO_2$, $CeO_2$, $MgO$, $Mg(OH)_2$, $NiO$, $Y_2O_3$, $CaO$, $SrTiO_3$, $BaTiO_3$, $SnO_2$, $ZnO$, $ZrO_2$, $BaSO_4$, silica, glass powder, a lithium-based inorganic substance, a piezoelectric inorganic metal mixture, a composite metal oxide of these metals, and the like, but are not limited thereto, and are not limited unless they are electrochemically unstable to have a great influence on battery performance.

In the separator for a secondary battery according to an exemplary embodiment, the sizes of the inorganic particles and the particles including the inorganic particles forming the porous active layer are not limited, but for example, may be in a range of 10 nm to 3 μm.

In the separator for a secondary battery according to an exemplary embodiment, the content of the particles is not particularly limited, but may be 70 to 99.9 parts by weight, specifically 70 to 99.75 parts by weight, and more specifically 90 to 99.75 parts by weight, based on 100 parts by weight of the total amount of the porous active layer, but is not necessarily limited thereto. Within the range, a binding force between the active layer and the substrate layer and a face-to-face binding effect among the inorganic particles may be further increased.

In the separator for a secondary battery according to an exemplary embodiment, the porous active layer binds among the particles by the act of the metal alkanoate having a polar group as a binder, and also, binds between the particles and the porous substrate, but if necessary, may further include an organic binder.

The organic binder may be used without limitation as long as it is usually used in a separator, and as an example, the binder may be any one or a mixture of two or more selected from polyvinylidene fluoride (PVdF), polytetrafluoroethylene (PTFE), polyurethane, polymethylpentene (PMP), polyethylene terephthalate (PET), polycarbonate (PC), polyester, polyvinyl acetamide (PNVA), polyvinyl alcohol (PVA), polyvinyl pyrrolidone (PVP), polyacrylonitrile (PAN), polymethylene oxide (PMO), polymethyl methacrylate (PMMA), polyethylene oxide (PEO), polyamide (PA), polyamideimide (PAI), polysulfone (PS), polyethersulfone (PES), polyarylate (PAR), polyimide (PI), polyaramid (PA), cellulose, copolymers using them, and the like, but is not necessarily limited thereto.

In the separator for a secondary battery according to an exemplary embodiment, the content of the organic binder may be 0.1 to 70 parts by weight, specifically 0.1 to 50 parts by weight, and more specifically 0.1 to 30 parts by weight, based on 100 parts by weight of the total content of the metal alkanoate having a polar group and the organic binder, but is not necessarily limited thereto.

In addition, in the separator for a secondary battery according to an exemplary embodiment, the content of the organic binder may be less than 1 part by weight, more specifically less than 0.5 parts by weight, based on 100 parts by weight of the total amount of the porous active layer, but is not necessarily limited thereto.

In the separator for a secondary battery according to an exemplary embodiment, the porous active layer may further include other commonly known additives in addition to the inorganic particles and the metal alkanoate having a polar group described above.

In the separator for a secondary battery according to an exemplary embodiment, as the porous substrate, a porous polymer film, a sheet, woven fabric, a non-woven fabric, and the like manufactured from a polymer used as the separator may be variously used, and also, a porous substrate having a laminated structure in which each layer is laminated in two or more layers may be included.

In an exemplary embodiment, the porous substrate may be a polyolefin-based porous film, and without limitation, for example, low-density polyethylene, linear low-density polyethylene, high-density polyethylene, ultrahigh-molecular weight polyethylene, polypropylene, copolymers or derivatives thereof, and the like may be used, but the present invention is not necessarily limited thereto.

Here, in the separator for a secondary battery according to an exemplary embodiment, any one or both selected from a surface and a pore portion of the porous substrate may be coated with the metal alkanoate having a polar group.

The thickness of the porous substrate may be in a range of 1 to 100 μm, specifically 5 to 60 μm, and more specifically 5 to 30 μm, but is not necessarily limited thereto as long as the object of the present disclosure is achieved.

The pore size and the porosity of the porous substrate are not particularly limited, but the porosity may be in a range of to 95% and the pore size (diameter) may be in a range of 0.001 to 20 μm, preferably 0.01 to 5 μm, and is not necessarily limited thereto as long as the object of the present disclosure is achieved.

In the separator for a secondary battery according to an exemplary embodiment, the porous active layer may have a thickness of 0.01 to 50 μm, specifically 0.1 to 10 μm, but is not necessarily limited thereto as long as the object of the present disclosure is achieved.

The separator for a secondary battery according to an exemplary embodiment may have a thickness of 1 to 100 μm, specifically 1 to 30 μm, but is not necessarily limited thereto as long as the object of the present disclosure is achieved.

Another exemplary embodiment relates to a method for manufacturing a separator for a secondary battery, and specifically, the method may include: applying a slurry including a metal alkanoate having a polar group and particles including inorganic particles on one or both surfaces of the porous substrate; and drying the porous substrate coated with the slurry to form a porous active layer.

In addition, the method for manufacturing a separator for a secondary battery according to an exemplary embodiment may include: a) dissolving a metal alkanoate having a polar group in a solvent to prepare a dispersion; b) dispersing inorganic particles or particles including the inorganic particles to the dispersion of step a) and performing dispersion; and c) applying the dispersion of step b) on an entire or part of a surface of a porous substrate film and performing drying to form an active layer.

In addition, the method for manufacturing a separator for a secondary battery according to an exemplary embodiment may include: a) adding a metal alkanoate having a polar group and inorganic particles at the same time and dispersing them in a solvent to prepare a dispersion; and b) applying the dispersion on an entire or part of a surface of a porous substrate film and performing drying.

Since kinds of porous substrate, inorganic particles, and binder are as described above, descriptions thereof will be omitted.

As the solvent of the dispersion, water may be mainly used, and other dispersion solvents, lower alcohols such as ethanol, methanol, and propanol, solvents such as dimethylformamide (DMF), acetone, tetrahydrofuran, diethylether, methylene chloride, N-ethyl-2-pyrrolidone, hexane, and cyclohexane, or mixtures thereof may be used, but the present invention is not necessarily limited thereto.

Aggregates of the inorganic particles may be crushed by mixing inorganic particles or particles including the inorganic particles with the metal alkanoate having a polar group, and using a ball mill, a beads mill, a planetary mixer (pulverization and mixing by revolution/rotation), and the like.

Here, a crushing time is appropriately 0.01 to 20 hours, and a particle size of the crushed inorganic particles may be 0.001 to 10 μm as mentioned above, but the present invention is not limited thereto. In addition, as the crushing method, a common method may be used, and in particular, methods using a ball mill, a beads mill, a planetary mixer, a homogenizer, and the like may be used, but the present invention is not necessarily limited thereto.

The dispersion prepared in this manner is applied on the porous substrate and dried, thereby obtaining the porous separator having the active layer of the present disclosure. Preferably, the separator of the present disclosure may be obtained by coating and drying on a polyolefin-based porous film.

The coating method may be performed in various ways of, for example, knife coating, roll coating, die coating, dip coating, and the like, but is not necessarily limited thereto as long as the object of the present disclosure is achieved.

The separator for a secondary battery of the present disclosure manufactured described above may be used as a separator of an electrochemical device, for example, a lithium secondary battery. The electrochemical device is not particularly limited, but, for example, may be a primary battery, a secondary battery, a fuel battery, a capacitor, and the like.

The lithium secondary battery may be manufactured by including the separator for a secondary battery according to an exemplary embodiment, a positive electrode, a negative electrode, and a nonaqueous electrolyte solution.

Since separator for a secondary battery is as described above, the description thereof will be omitted.

The positive electrode and the negative electrode may be manufactured by mixing a positive electrode active material and a negative electrode active material with a solvent, and if necessary, a binder, a conductive material, a dispersing material, and the like and performing stirring to prepare a mixture, which is applied on a current collector of a metal material and dried, and then pressed.

Any positive electrode active material is usable, as long as it is an active material commonly used in the positive electrode of a secondary battery. For example, lithium metal oxide particles including one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof may be used, but the present invention is not necessarily limited thereto.

Any negative electrode active material is usable, as long as it is an active material commonly used in the negative electrode of a secondary battery. The negative electrode active material of the lithium secondary battery may be a material capable of lithium intercalation. As a non-limiting exemplary embodiment, the negative electrode active material may be one or two or more materials selected from the group consisting of lithium (metal lithium), easily graphitized carbon, hardly graphitized carbon, graphite, silicon, an Sn alloy, an Si alloy, an Sn oxide, an Si oxide, a Ti oxide, an Ni oxide, a Fe oxide (FeO), and a lithium-titanium oxide ($LiTiO_2$, $Li_4Ti_5O_{12}$), but is not necessarily limited thereto.

As the conductive materials, a common conductive carbon material may be used without limitation.

The current collector of the metal material is a metal which has high conductivity and to which the mixture of the positive electrode or the negative electrode active material may be easily adhered, and any one may be used as long as it has no reactivity in the range of battery voltage. A non-limiting example of the positive electrode current collector may include foil and the like made of aluminum, nickel, or a combination thereof, and a non-limiting example of the negative electrode current collector may include foil and the like made of copper, gold, nickel, a copper alloy, or a combination thereof, but the present invention is not necessarily limited thereto.

The separator is interposed between the positive electrode and the negative electrode, and as a method of applying the separator to a battery, lamination (stack), folding, and the like of the separator and the electrode are possible, but the present invention is not necessarily limited thereto.

The nonaqueous solution includes a lithium salt as an electrolyte and an organic solvent, and as the lithium salt, those commonly used in the electrolyte solution for a lithium secondary battery may be used without limitation and may be represented by $Li^+X^-$.

The anion of the lithium salt is not particularly limited, and any one or two or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used, but the present invention is not necessarily limited thereto.

As the organic solvent, any one or a mixture of two or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimetoxyethane, diethoxyethane, sulfolane, γ-butyrolactone, tetrahydrofuran, and the like may be used, but the present invention is not necessarily limited thereto.

The nonaqueous electrolyte solution may be injected to an electrode structure formed of a positive electrode, a negative electrode, and a separator interposed between the positive electrode and the negative electrode.

The external shape of the lithium secondary battery is not particularly limited, but may be selected from a cylindrical shape, a square shape, a pouch shape, a coin shape, and the like. Hereinafter, the present disclosure will be described in more detail with reference to the Examples and Comparative Examples. However, the following Examples and Comparative Examples are only an example for describing the present disclosure in more detail, and do not limit the present disclosure in any way.

[Method of Measuring Physical Properties]

(1) Thermal Shrinkage Rate

A separator of 10 cm×10 cm was allowed to stand at 130° C. and 150° C., respectively, and a reduction rate of an area was measured to determine the thermal shrinkage rate. The thermal shrinkage was evaluated by calculating a shrinkage rate in a machine direction (MD) of the following Equation 1 and a shrinkage rate in a transverse direction (TD) of the following Equation 2:

Thermal-resistant shrinkage rate in machine direction (%)=(length in machine direction before heating−length in machine direction after heating)/length in machine direction before heating)×100 [Equation 1]

Thermal-resistant shrinkage rate in transverse direction (%)=(length in transverse direction before heating−length in transverse direction after heating)/length in transverse direction before heating)×100 [Equation 2]

(2) Gurley Permeability

As a gas permeability, a Gurley permeability was measured. It was measured according to the standard of ASTM D726, using Densometer available from Toyoseiki. How long it takes for 100 cc of air to pass through a separator having an area of 1 in² was recorded in seconds and compared. The gas permeability described in Table 1 was calculated using Equation 3.

Δ Gurley permeability (sec)=gas permeability of separator having porous active layer formed therein−gas permeability of porous substrate [Equation 3]

(3) Adhesion Test of Strawboard

A separator was cut into a size of 50 mm×50 mm, and was placed on a rubber pad with an inorganic layer placed underneath. A black strawboard (20 mm×50 mm×T 0.25 mm) was placed between the separator and a rubber pad, and a constant pressure (10 g/cm²) was applied using a presser. The black strawboard was forcefully pulled aside, and a degree of inorganic substance adhered on the surface was confirmed to be identified as A/B/C depending on the adhered degree, considering the following grade:

A: no adhesion
B: inorganic substance adhered in a small amount
C: binder and inorganic substance adhered together (4) Electrochemical Measurement of Battery Each impedance of the batteries manufactured by each assembly process was measured using a charge/discharge cycle device, and the results are shown in Table 1.

A chamber temperature was maintained at room temperature (25° C.) using a device, and the battery was charged with a constant current-constant voltage (CC-CV) of 4.2 V and then discharged down to 2.5 V, as a method of measuring life and resistance at room temperature. The charge/discharge was measured by performing 0.5 C charge and 0.5 C discharge from 4.2 V to 2.5 V 20 times. During the process, an average of DC-KR impedance values of each cycle was shown. The resistance increase rate described in Table 1 was calculated using Equation 4.

Resistance increase rate (%)=((resistance of separator including coating layer−resistance of polyethylene (PE) film)/resistance of polyethylene (PE) film)×100 [Equation 4]

[Manufacture of Separator for Secondary Battery]

Example 1

1.5 parts by weight of aluminum L-lactate was added to 100 parts by weight of distilled water and dispersion was performed, and 98.5 parts by weight of boehmite (γ-AlO(OH)) having an average diameter of 500 nm (Nabaltec, Apyral AOH60) was added and stirring was performed, thereby preparing a uniform aqueous slurry.

As a porous substrate, a polyethylene porous film having a thickness of 9 μm (porosity 50%, Gullery conct. 70 sec/100 cc, tensile strength MD 2110 kgf/cm², TD 1870 kgf/cm²) was used, both surfaces of the porous film was subjected to a corona discharge treatment (power density: 2 W/mm) to introduce a surface polar group, and the corona surface treatment was performed at a speed of 5 mpm (meter per minute).

The both surfaces of the porous substrate were coated with aqueous slurry, and drying and winding were performed, and the thickness of the coating layers on both surfaces after the drying was 4 μm, respectively.

Example 2

The process was performed in the same manner as in Example 1, except that 5 parts by weight of aluminum L-lactate was added to 100 parts by weight of distilled water and dispersion was performed, and 95 parts by weight of boehmite (γ-AlO(OH)) having an average diameter of 500 nm (Nabaltec, Apyral AOH60) was added and stirring was performed, thereby preparing a uniform aqueous slurry.

Example 3

The process was performed in the same manner as in Example 1, except that 8 parts by weight of aluminum L-lactate was added to 100 parts by weight of distilled water and dispersion was performed, and 92 parts by weight of boehmite (γ-AlO(OH)) having an average diameter of 500 nm (Nabaltec, Apyral AOH60) was added and stirring was performed, thereby preparing a uniform aqueous slurry.

Example 4

The process was performed in the same manner as in Example 1, except that 1.5 parts by weight of aluminum L-lactate and 0.5 parts by weight of acrylic latex having $T_g$ of −52° C. (trade name: BM900B, solid content: 20 parts by weight) were added to 100 parts by weight of distilled water and dispersion was performed, and 98 parts by weight of boehmite (γ-AlO(OH)) having an average diameter of 500 nm was added and stirring was performed, thereby preparing a uniform aqueous slurry.

Example 5

The process was performed in the same manner as in Example 1, except that boehmite (γ-AlO(OH)) having an average diameter of 2 μm was used.

Comparative Example 1

The process was performed in the same manner as in Example 1, except that 1.5 parts by weight of acrylic latex having $T_g$ of −52° C. (trade name: BM900B, solid content: 20 parts by weight) was added to 100 parts by weight of distilled water and dispersion was performed, and 98.5 parts by weight of boehmite (γ-AlO(OH)) having an average diameter of 500 nm was added and stirring was performed, thereby preparing a uniform aqueous slurry.

Comparative Example 2

The process was performed in the same manner as in Example 1, except that 5 parts by weight of acrylic latex having $T_g$ of −52° C. (trade name: BM900B, solid content: 20 parts by weight) was added to 100 parts by weight of distilled water and dispersion was performed, and 95 parts by weight of boehmite (γ-AlO(OH)) having an average diameter of 500 nm was added and stirring was performed, thereby preparing a uniform aqueous slurry.

Comparative Example 3

The process was performed in the same manner as in Example 1, except that 5 parts by weight based on the solid content of a polyvinylidene fluoride binder which was dissolved at 30 parts by weight in dimethyl sulfoxide (DMSO) and 95 parts by weight of boehmite (γ-AlO(OH)) (Nabaltec, Apyral AOH60) having an average particle diameter of 500 nm were mixed and stirred to prepare a uniform slurry.

Comparative Example 4

The process was performed in the same manner as in Example 1, except that 1 part by weight of aluminum L-lactate and 4 parts by weight of acrylic latex having $T_g$ of −52° C. (trade name: BM900B, solid content: 20 parts by weight) was added to 100 parts by weight of distilled water and dispersion was performed, and 95 parts by weight of boehmite (γ-AlO(OH)) having an average particle diameter of 500 nm was added and stirring was performed, thereby preparing a uniform aqueous slurry.

Comparative Example 5

The process was performed in the same manner as in Example 1, except that 35 parts by weight of aluminum L-lactate was added to 100 parts by weight of distilled water and dispersion was performed, and 65 parts by weight of boehmite (γ-AlO(OH)) having an average diameter of 500 nm (Nabaltec, Apyral AOH60) was added and stirring was performed, thereby preparing a uniform aqueous slurry.

Comparative Example 6

The process was performed in the same manner as in Example 1, except that boehmite (γ-AlO(OH)) having an average diameter of 5 μm was used.

[Manufacture of Lithium Secondary Battery]
(1) Manufacture of Positive Electrode 94 parts by weight of $LiCoO_2$ as a positive electrode active material, 2.5 parts by weight of polyvinylidene fluoride as an adhesive, and 3.5 parts by weight of carbon black as a conductive agent were added to N-methyl-2-pyrrolidone (NMP) as a solvent, and stirring was performed to prepare a uniform positive electrode slurry. An aluminum foil having a thickness of 30 μm was coated with the slurry, dried at a temperature of 120° C., and pressed to manufacture a positive electrode plate having a thickness of 150 μm.

(2) Manufacture of Negative Electrode 95 parts by weight of artificial graphite as a negative electrode active material, 3 parts by weight of acrylic latex having $T_g$ of −52° C. (trade name: BM900B, solid content: 20 parts by weight), and 2 parts by weight of carboxymethyl cellulose (CMC) as a thickener were added to water as a solvent, and stirring was performed to prepare a uniform negative electrode slurry. A copper foil having a thickness of 20 μm was coated with the slurry, dried at a temperature of 120° C., and pressed to manufacture a negative electrode plate having a thickness of 150 μm.

(3) Manufacture of Battery

The positive electrode and the negative electrode as manufactured above, and the separators manufactured in Examples 1 to 5 and Comparative Examples 1 to 6 were used to assemble a pouch type battery in a stacking manner, and to each of the assembled batteries, an electrolyte solution of 1M lithium hexafluorophosphate ($LiPF_6$) dissolved in ethylene carbonate (Ec)/ethylmethyl carbonate (EMC)/dimethyl carbonate (DMC)=3:5:2 (volume ratio) was injected, thereby manufacturing a lithium secondary battery.

The results of evaluating characteristics of the separators for a secondary battery and the lithium secondary batteries manufactured therefrom are shown in the following Table 1.

TABLE 1

| | Physical properties of separator | | | | | Battery | | |
|---|---|---|---|---|---|---|---|---|
| | | Thermal shrinkage rate (%) | | Δ Gurley permeability | Adhesive strength | Resistance (mΩ) | | Resistance increase rate |
| | Thickness μm | 130° C. | 150° C. | sec/100 cc | Strawboard | Average | Standard deviation | % |
| Example 1 | 4 | <1 | <2 | 30 | A | 1399 | 9.5 | 1.25 |
| Example 2 | 4 | <1 | <2 | 42 | A | 1433 | 26 | 3.73 |
| Example 3 | 4 | <1 | <2 | 48 | A | 1490 | 31 | 7.78 |
| Example 4 | 4 | <1 | <2 | 37 | A | 1380 | 24 | 4.69 |
| Example 5 | 4 | <1 | <2 | 36 | A | 1410 | 29 | 5.99 |

TABLE 1-continued

| | Physical properties of separator | | | | | Battery | | |
| --- | --- | --- | --- | --- | --- | --- | --- | --- |
| | Thickness | Thermal shrinkage rate (%) | | Δ Gurley permeability | Adhesive strength | Resistance (mΩ) | | Resistance increase rate |
| | μm | 130° C. | 150° C. | sec/100 cc | Strawboard | Average | Standard deviation | % |
| Comparative Example 1 | 4 | 3 | >50 | 59 | B | 1412 | 50 | 2.17 |
| Comparative Example 2 | 4 | <2 | 12 | 78 | B | 1534 | 95 | 10.99 |
| Comparative Example 3 | 4 | 8 | >50 | 61 | C | 1550 | 48 | 9.85 |
| Comparative Example 4 | 4 | <2 | <5 | 89 | B | 1563 | 46 | 6.33 |
| Comparative Example 5 | 4 | 2 | 4 | 132 | B | 1496 | 52 | 5.25 |
| Comparative Example 6 | 4 | 3 | >50 | 36 | C | 1482 | 57 | 5.12 |

As shown in Table 1, it was confirmed that the separators of Examples 1 to 5 having an active layer formed therein by including aluminum L-lactate as the metal alkanoate having a polar group and inorganic particles on both surfaces of the porous substrate showed a significantly low thermal shrinkage rate, a high permeability, and an excellent adhesion as compared with the comparative examples, though the separators of the examples contained a small amount of or no organic binder.

In addition, it was recognized that the batteries had low resistance, a low standard deviation, and a low resistance increase rate. This is considered to be since the metal alkanoate having a polar group such as aluminum L-lactate is electrochemically more stable on an electrolyte solution than the organic binder.

In particular, when the organic binder was out of the content range defined as an embodiment and was included in excess, as in Comparative Example 4, it was confirmed that though aluminum L-lactate was included, the thermal and mechanical properties of the separator were slightly lowered as compared with those of the examples, and, in particular, the organic binder was added in excess to greatly increase air permeability and the resistance of the battery was greatly increased, thereby significantly decreasing the stability of the battery as compared with the examples.

In addition, when the weight ratio of the inorganic particles and aluminum L-lactate included in the slurry was out of the range defined as an embodiment as in Comparative Example 5, it was confirmed that the content of the inorganic particles was decreased to significantly decrease thermal resistance, air permeability was increased by an excessive amount of aluminum L-lactate, and the battery resistance was also increased to significantly decrease the battery stability as compared with the examples.

In addition, when the average particle diameter of the inorganic particles was more than 3 μm as in Comparative Example 6, it was confirmed that the thermal and mechanical properties of the separator were slightly lowered as compared with the examples.

As described above, it is recognized that the separator of the present disclosure includes the metal alkanoate having a polar group on a polyolefin-based separator substrate having a pore portion, thereby implementing significantly excellent thermal shrinkage, permeability, and sufficient adhesion even when a small amount of or no organic binder is used, and showing excellent properties in battery charge and discharge properties.

Accordingly, by introducing the active layer having a thermal resistant pore structure of a micro unit formed therein by the present disclosure, thermal and electrochemical stability and performance improvement of the battery may be significantly increased.

The separator for a secondary battery according to an exemplary embodiment has improved thermal resistance, thereby preventing ignition or rupture due to an abnormal phenomenon such as a rapid temperature rise.

In addition, when a metal alkanoate having a polar group and particles including inorganic particles are mixed and dispersed as in the present disclosure, dispersion is performed well, adhesive strength in coating is also equal to or better than that of an active layer using a polymer-based organic binder, and even in the case of not including a polymer-based organic binder, adhesive properties may be equal to or better than those in the case of using the polymer binder.

In addition, the separator for a secondary battery according to an exemplary embodiment may have significantly increased thermal resistance and chemical resistance.

In addition, the separator for a secondary battery according to an exemplary embodiment has low resistance and a small resistance deviation even with a porous active layer provided, has a characteristic that the resistance of the separator provided with the active layer relative to the resistance of the separator before being provided with the active layer is not greatly increased as compared with the resistance of the separator adopting the polymer-based organic binder, and is electrochemically stable.

Hereinabove, although the separator for a secondary battery, the method for manufacturing the same, and the lithium secondary battery including the same have been described in the present disclosure by specific matters and limited exemplary embodiments, they have been provided only for assisting in the entire understanding of the present disclosure, and the present disclosure is not limited to the above exemplary embodiments, and various modifications and changes may be made by those skilled in the art to which the present disclosure pertains from the description.

Therefore, the spirit of the present disclosure should not be limited to the above-described exemplary embodiments, and the following claims as well as all modified equally or equivalently to the claims are intended to fall within the scope and spirit of the disclosure.

What is claimed is:

1. A separator for a secondary battery comprising:
   (a) a porous substrate; and
   (b) a porous active layer formed by comprising a metal alkanoate having a polar group and particles including inorganic particles on one or both surfaces of the porous substrate,
   wherein the metal alkanoate having the polar group binds among the particles and also between the particles and the porous substrate, and
   wherein the polar group comprises a hydroxyl group.

2. The separator for a secondary battery of claim 1, wherein the polar group further comprises one or more selected from a carbonyl group, an amine group, and a thiol group.

3. The separator for a secondary battery of claim 1, wherein the metal alkanoate having the polar group is aluminum L-lactate.

4. The separator for a secondary battery of claim 1, wherein the inorganic particles are any one or a mixture of two or more selected from metal oxides, metal nitrides, metal carbides, metal carbonates, metal hydrates, metal sulfate and metal carbonitrides.

5. The separator for a secondary battery of claim 1, wherein the inorganic particles are any one or a mixture of two or more selected from boehmite, $Al_2O_3$, $Al(OH)_3$, $TiO_2$, $CeO_2$, $MgO$, $Mg(OH)_2$, $NiO$, $Y_2O_3$, $CaO$, $SrTiO_3$, $BaTiO_3$, $SnO_2$, $ZnO$, $ZrO_2$, $BaSO_4$, silica, and glass powder.

6. The separator for a secondary battery of claim 1, wherein the inorganic particles have a size of 10 nm to 3 μm.

7. The separator for a secondary battery of claim 1, wherein the metal alkanoate having the polar group is included at 0.1 to 30 parts by weight based on 100 parts by weight of a total amount of the porous active layer.

8. The separator for a secondary battery of claim 1, wherein the particles are included at 70 to 99.9 parts by weight based on 100 parts by weight of a total amount of the porous active layer.

9. The separator for a secondary battery of claim 1, wherein the porous active layer further comprises an organic binder.

10. The separator for a secondary battery of claim 9, wherein the organic binder is included at 0.1 to 70 parts by weight based on 100 parts by weight of contents of the metal alkanoate having the polar group and the organic binder in the porous active layer.

11. The separator for a secondary battery of claim 9, wherein the organic binder is included at less than 1 part by weight based on 100 parts by weight of a total amount of the porous active layer.

12. The separator for a secondary battery of claim 1, wherein any one or both selected from a surface and a pore portion of the porous substrate are coated with the metal alkanoate having the polar group.

13. A method for manufacturing the separator of claim 1, the method comprising:
   applying a slurry comprising the metal alkanoate having the polar group and the particles including the inorganic particles on one or both surfaces of the porous substrate; and
   drying the porous substrate coated with the slurry to form the porous active layer,
   wherein the polar group comprises the hydroxyl group.

14. The method of claim 13, wherein the polar group further comprises one or more selected from a carbonyl group, an amine group, and a thiol group.

15. The method of claim 13, wherein the metal alkanoate having the polar group is aluminum L-lactate.

16. The method of claim 13, wherein the metal alkanoate having the polar group is included at 0.1 to 30 parts by weight based on 100 parts by weight of a total amount of the porous active layer.

17. An electrochemical device comprising the separator for a secondary battery of claim 1.

18. The electrochemical device of claim 17, wherein the electrochemical device is a lithium secondary battery.

19. A separator for a secondary battery comprising:
   (a) a porous substrate; and
   (b) a porous active layer formed by comprising a metal alkanoate having a polar group and particles including inorganic particles on one or both surfaces of the porous substrate,
   wherein the metal alkanoate having the polar group binds among the particles and also between the particles and the porous substrate, and
   wherein the metal alkanoate having the polar group has a structure represented by the following Chemical Formula 1:

$$M(^-OCOR)_a \qquad \text{[Chemical Formula 1]}$$

wherein M is any one selected from alkali earth metals, transition metals, Al, Ga, In, Sn, Pb, Ge, and Sb, R is a C1 to C10 substituted or unsubstituted alkyl group having the polar group, and a is an integer selected from 2 to 4.

20. A method for manufacturing the separator of claim 19, the method comprising:
   applying a slurry comprising the metal alkanoate having the polar group and the particles including the inorganic particles on one or both surfaces of the porous substrate; and
   drying the porous substrate coated with the slurry to form the porous active layer,
   wherein the metal alkanoate having the polar group has the structure represented by the following Chemical Formula 1:

$$M(^-OCOR)_a \qquad \text{[Chemical Formula 1]}$$

wherein M is any one selected from alkali earth metals, transition metals, Al, Ga, In, Sn, Pb, Ge, and Sb, R is a C1 to C10 substituted or unsubstituted alkyl group having the polar group, and a is an integer selected from 2 to 4.

* * * * *